(12) United States Patent
De Ruijter et al.

(10) Patent No.: US 9,438,290 B2
(45) Date of Patent: Sep. 6, 2016

(54) RECEIVER HAVING A CALIBRATION SOURCE

(75) Inventors: Hendricus De Ruijter, Sunnyvale, CA (US); Tamas Marozsak, Budapest (HU); Peter Onody, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 741 days.

(21) Appl. No.: 13/244,587

(22) Filed: Sep. 25, 2011

(65) Prior Publication Data

US 2013/0078936 A1    Mar. 28, 2013

(51) Int. Cl.
*H04B 1/18* (2006.01)
*H04B 1/28* (2006.01)
*H04B 15/00* (2006.01)

(52) U.S. Cl.
CPC ...................................... *H04B 1/28* (2013.01)

(58) Field of Classification Search
CPC ........................................................ H03D 7/18
USPC .......................... 455/285, 295–296, 302, 317
See application file for complete search history.

(56) References Cited

U.S. PATENT DOCUMENTS 7,362,826 B2 *  4/2008  Willingham ................... 375/327
7,676,210 B2 *  3/2010  Paulus et al. .................. 455/302

* cited by examiner

*Primary Examiner* — Lee Nguyen
(74) *Attorney, Agent, or Firm* — Trop Pruner & Hu, P.C.

(57) ABSTRACT

An RF receiver includes an RF signal reception path to process an input signal for the receiver for a first mode of the receiver; an oscillator; and a harmonic generator. The harmonic generator generates a harmonic signal in response to operation of the oscillator to replace the input signal with the harmonic signal for a second mode of the receiver.

17 Claims, 5 Drawing Sheets

RECEIVER HAVING A CALIBRATION SOURCE

BACKGROUND

For purposes of wirelessly communicating data, a radio frequency (RF) carrier signal may be modulated with the data to produce an RF signal to drive an antenna. One type of modulation is angle modulation, which involves modulating the angle of the carrier signal. The angle modulation may involve modulating the frequency of the radio frequency (RF) carrier signal (called "frequency modulation (FM)") or modulating the phase of the carrier signal (called "phase modulation (PM)").

An angle modulation receiver may contain a mixer that downconverts the spectral content in a tuned-in, or selected, RF channel of a received RF signal to a lower intermediate frequency (IF) channel that is more suitable for processing by the receiver. The receiver processes the IF frequency to obtain the information originally modulated onto the RF signal.

SUMMARY

In an example embodiment, a technique includes using a signal reception path in a radio frequency (RF) receiver to process an input signal for the receiver for a first mode of the receiver; using a harmonic generator of the receiver to generate a harmonic signal; and using the harmonic signal to replace the input signal with the harmonic for a second mode of the receiver.

In another example embodiment, an RF receiver includes an RF signal reception path to process an input signal for the receiver for a first mode of the receiver; an oscillator; and a harmonic generator. The harmonic generator generates a harmonic signal in response to operation of the oscillator to replace the input signal with the harmonic signal for a second mode of the receiver.

In yet another example embodiment, an apparatus includes an integrated circuit that includes an RF signal reception path, an oscillator and a harmonic generator. The harmonic generator generates a harmonic signal in response to operation of the oscillator during a calibration mode of an RF receiver to calibrate an image rejection of the receiver.

Advantages and other features of the disclosed concepts will become apparent from the following drawing, description and claims.

DETAILED DESCRIPTION

Figure 1:
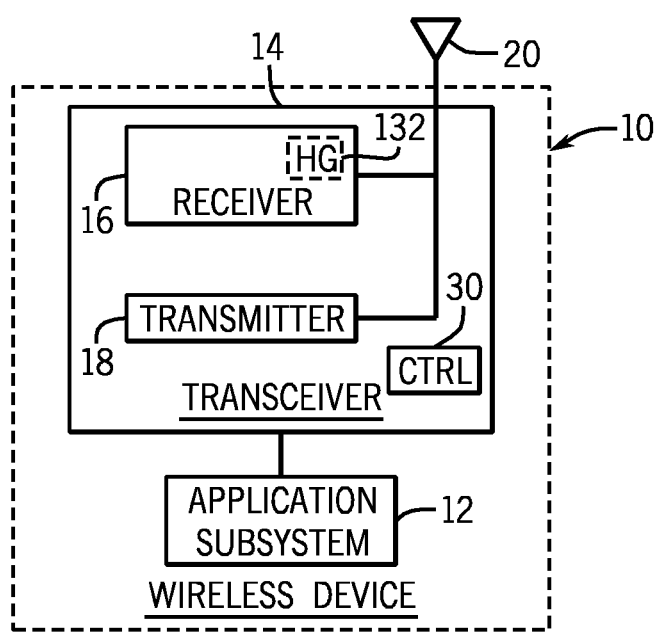
FIG. 1 is a schematic diagram of a wireless device according to an exemplary embodiment.

Referring to FIG. 1, a wireless device 10 may be used in a number of different applications for purposes of communicating data over a wireless link. As non-limiting examples, the wireless device 10 may be a personal computer (PC) peripheral; a wireless toy; a remote keyless entry; an industrial control; a home automation controller, sensor or slave device; a sensor network; etc. In general, the wireless device 10 includes an application subsystem 12, which tailors the wireless device 10 for its specific application and may, for example, form a user interface for the device 10. In general, the application subsystem 12 performs various application processing tasks relating to the application in which the wireless device 10 is employed, and these tasks may involve communicating data to a transceiver 14 of the wireless device 10 to be transmitted over a wireless link and receiving data from the transceiver 14, which was received as a result of wireless communication over the wireless link. It is noted that in other exemplary embodiments, the wireless device 10 may only receive data and not include the transmitter 18. Thus, many variations are contemplated and are within the scope of the appended claims.

The transceiver 14 for the exemplary embodiment depicted in FIG. 1 includes a transmitter 18 that is coupled to an antenna 20 for purposes of transmitting data over the wireless link. In this manner, the transmitter 18 modulates a carrier signal with data to be transmitted and provides the resulted modulated carrier signal to the antenna 20, which radiates electromagnetic energy in response to the signal to transmit the data over the wireless link. The transceiver 14 for the embodiment depicted in FIG. 1 also includes a receiver 16, which is coupled to the antenna 20 for purposes of receiving a modulated carrier signal that is indicative of data that is received from the wireless link. The receiver 16 demodulates the modulated carrier signal to recover the transmitted data and provides this data to the application subsystem 12.

In accordance with other exemplary embodiments, the receiver 16 and the transmitter 18 may be coupled to separate antennas of the wireless device 10. Moreover, in accordance with some exemplary embodiments, the wireless device 10 may include multiple antennas 20 that the wireless device 10 selectively couples to the transmitter 18, depending on one or more transmission frequency bands that may be selected for the communication over the wireless link. In a similar manner, in accordance with some exemplary embodiments, the wireless device 10 may include multiple antennas 20 that the wireless device 10 selectively couples to the receiver 16, depending on one of multiple transmission frequency bands that may be selected for communication over the wireless link.

Figure 2:
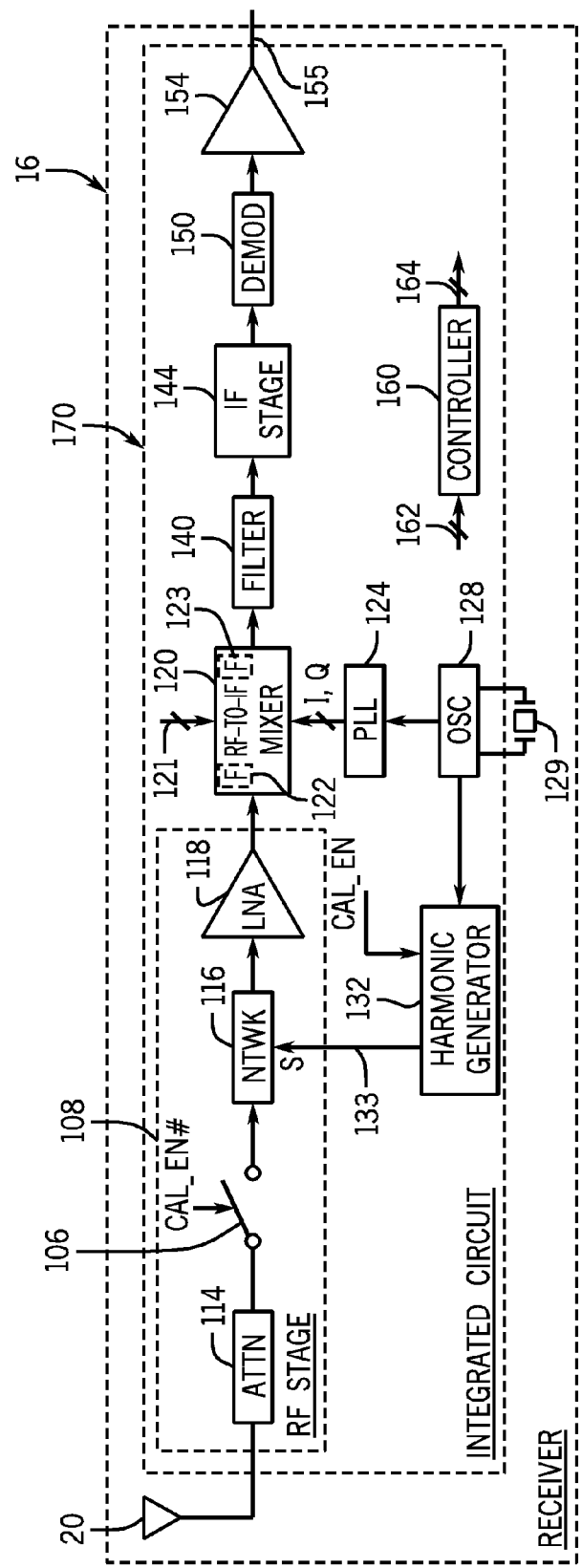
FIG. 2 is a schematic diagram of a receiver of the wireless device of FIG. 1 according to an exemplary embodiment.

Referring to FIG. 2, in accordance with some exemplary embodiments, the receiver 16 includes various components, which may be part of the same integrated circuit 170 (may be fabricated in the same or on separate dies of the same semiconductor package, for example). In some exemplary embodiments, the entire receiver 16 may be fabricated on a single die and as such, may be part of a single integrated circuit, multi chip module (MCM), etc.

The receiver 16 receives an RF signal, i.e., a signal produced by the modulation (phase modulation (PM) or frequency modulation (FM), as non-limiting examples) of a radio frequency (RF) carrier signal with certain content. For examples disclosed herein, the receiver 16 employs an intermediate frequency (IF) architecture that includes an RF stage 108 to process an RF signal received from the antenna 20; an RF-to-IF mixer 120 to downconvert spectral content in a tuned-in, or selected, RF band of the processed RF signal to an IF band; an IF stage 144 that downconverts the spectral content in the IF band to zero frequency to form a baseband (BB) signal; and a demodulator 150 to demodulate the BB signal.

More specifically, as depicted in FIG. 2, the RF stage 108 receives an RF signal from the antenna 20 and furnishes a resulting RF signal to the mixer 120 that downconverts spectral content in a selected RF band to the IF band. In this regard, as illustrated in FIG. 2, the RF stage 108 may include such components as a programmable attenuator 114 and a low noise amplifier (LNA) 118, which the receiver 16 may use to control a gain of the received RF signal for purposes of employing automatic gain control (AGC). In this manner, the AGC allows the receiver 16 to adjust the internal gain of the processed signal to accommodate a wide range of received signal strengths so that relatively weak signals are amplified to improve the receiver's signal-to-noise (S/N) ratio and relatively strong signals are attenuated to avoid introducing nonlinearities into the processed signal. The output of the LNA 118 is coupled to the mixer 120. Alternatively, or in addition to the above-described AGC, the receiver 16 may control the signal gain in the IF stage 144 for purposes of implementing AGC.

The IF signal provided by the mixer 120 is communicated through a low pass filter 140 and enters the IF stage 144. The IF stage 144 downconverts the spectral content in the IF band to produce the BB signal that is demodulated by a demodulator 150. As a non-limiting example, the demodulator 150 provides the demodulated signal to an amplifier 154 that provides the amplified, demodulated signal at its output terminal(s) 155.

In accordance with an exemplary embodiment, the mixer 120 mixes the RF signal that is received from the RF stage 108 with complex, quadrature in-phase (I) and quadrature (Q) sinusoidal signals that are provided by a phase locked loop (PLL) 124. In this regard, the I and Q signals that are furnished by the PLL 124 have fundamental frequencies set to a local oscillation (LO) frequency. In accordance with example embodiments, the PLL 124 generates the I and Q signals by locking onto an oscillating signal that is provided by a reference oscillator 128. As shown in FIG. 2, the frequency of operation of the oscillator 128 may be set by a crystal 129.

To tune to a specific RF band, a controller 160 of the receiver 16 operates the PLL 124 to control the fundamental frequencies of the in-phase (I) and quadrature (Q) signals such that spectral content from the selected RF channel is downconverted to the IF band. As shown in FIG. 2, the controller 160 may have various input terminals 162 and output terminals 164 to perform the frequency control as well as other types of control, as discussed further below. Due to sum and difference beat frequencies that are produced by the operation of the mixer 120, undesired spectral content outside of the selected RF band may also be downconverted to the IF band. More specifically, as persons of ordinary skill in the art understand, the spectral content in at least two RF bands may be translated to the IF band due to the operation of the mixer 120: the spectral content in the selected or desired RF frequency band and the spectral content in another RF frequency band called the "image."

As a more specific non-limiting example, the selected RF band may be centered at 100 Megahertz (MHz); and the frequencies of the I and Q signals may each be 80 MHz. For this example, the sum and difference beat frequencies produced due to the operation of the mixer 120 produce spectral content that is centered at 180 MHz and 20 MHz (i.e., the central RF band frequency of 100 MHz±the local oscillator frequency of 80 MHz). The lower frequency of 20 MHz is the center frequency of the IF band for this example. Therefore, although operation of the mixer 120 tunes the receiver 16 to the selected RF band at 100 MHz, spectral content from outside the selected frequency band, i.e., the image, is also tuned to the IF band. For this example, the image is the spectral energy in a frequency band centered at 60 MHz, which is due to the sum and difference beat frequencies that are produced by operation of the mixer 120.

The receiver 16 contains circuitry to suppress the image. For example, the mixer 120 may be an image suppression mixer that contains one or more filters 122 and 123 that are constructed to suppress the image. As another example, the RF stage 108 may contain an image suppression filter upstream of the mixer 120 to suppress the image.

Regardless of how the receiver 16 suppresses the image, the circuitry that performs the image suppression may be calibrated. In accordance with embodiments, circuitry that is efficient with respect to die area and circuit complexity is disclosed herein to calibrate the receiver's image suppression. Moreover, the circuitry may be used at various times during the receiver's lifetime to account for time varying parameters (environmental changes, such as temperature, for example) that affect the receiver's image suppression.

In accordance with example embodiments disclosed herein, the receiver 16 includes a harmonic generator 132, which when enabled, generates an image signal (called "S" in the figures), which is introduced into the RF stage 108 during an image rejection calibration mode of the receiver 16. In accordance with example embodiments, the harmonic generator 132 is coupled to the receiver's local oscillator 128 for purposes of generating harmonics of the periodic signal that is generated by the oscillator 128.

Figure 3:
FIG. 3 is an illustration of spectral energy generated by a harmonic generator of the receiver of FIG. 2 according to an exemplary embodiment.

Referring to FIG. 3 in conjunction with FIG. 2, as can be seen from FIG. 3, the S signal contains spectral energy 202 at a fundamental frequency (called "$f_x$" in FIG. 3) of the oscillator's periodic signal as well as harmonics 204, 206, 208 and 210 of the fundamental frequency $f_x$. It is noted that the harmonics 204, 206, 208 and 210 may be odd harmonics and/or even harmonics, depending on the particular embodiment. Because the harmonic generator 132 is part of the receiver 16 (part of the same integrated circuit 170, for example), the receiver 16 may be periodically placed in a calibration mode and the receiver's image rejection may be recalibrated to account for any changes that may affect the receiver's image rejection over the receiver's life time.

Referring to FIG. 2, for purposes of calibrating the receiver's image rejection, the receiver 16 is first placed in an image rejection calibration mode. In accordance with some embodiments, a calibration enable signal, which is received by (called "CAL_EN" in FIG. 2) is asserted (driven to a logic one value, for example) to enable the harmonic generator 132, which causes the generator 132 to provide the S image signal to the RF stage 108. Also in the calibration mode, a switch 106 near the input of the RF stage 108 is opened for purposes of isolating the antenna 20 from the remainder of the RF stage 108 to ensure that the RF stage 108 processes only the S image signal during the calibration. Therefore, during the image rejection calibration mode, the receiver 16 responds only to the image and not to spectral content in the selected RF channel. As depicted in FIG. 2, in accordance with example embodiments, the switch 106 may be operated by the inverse of the CAL_EN calibration enable signal (i.e., may be operated via a CAL_EN# signal) such that during normal operation, the switch 106 is closed to couple the antenna 20 to the remainder of the RF stage 108; and during the image rejection calibration mode, the switch 106 is open to isolate the antenna 20 from the remainder of the RF stage 108.

Figure 4:
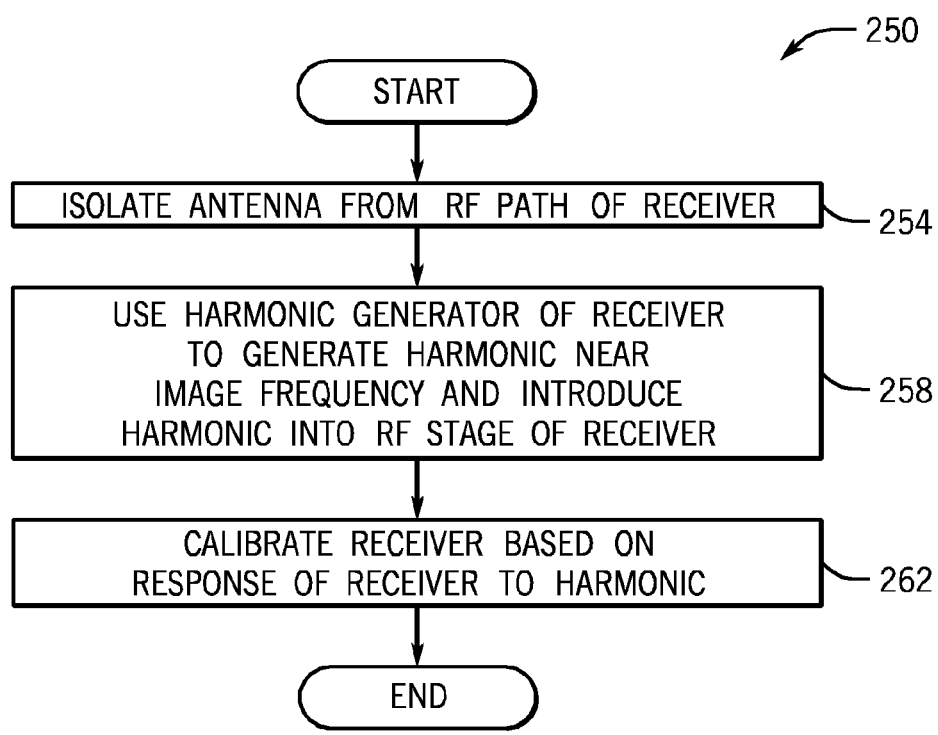
FIGS. 4 and 8 are flow diagrams depicting techniques to calibrate an image rejection of the receiver of FIG. 2 using the harmonic generator according to exemplary embodiments.

Referring to FIG. 4, in conjunction with FIG. 2, using the harmonic generator 132 of the receiver 16, a technique 250 may be used to calibrate the image suppression circuitry of the receiver 16, in accordance with example embodiments. Pursuant to the technique 250, the antenna is isolated from the RF stage 108, pursuant to block 254, and the harmonic generator 132 of the receiver 16 is used (block 258) to generate a harmonic near the image frequency band. The receiver 16 is calibrated based on the response of the receiver 16 to the harmonic, pursuant to block 262.

Figure 5:
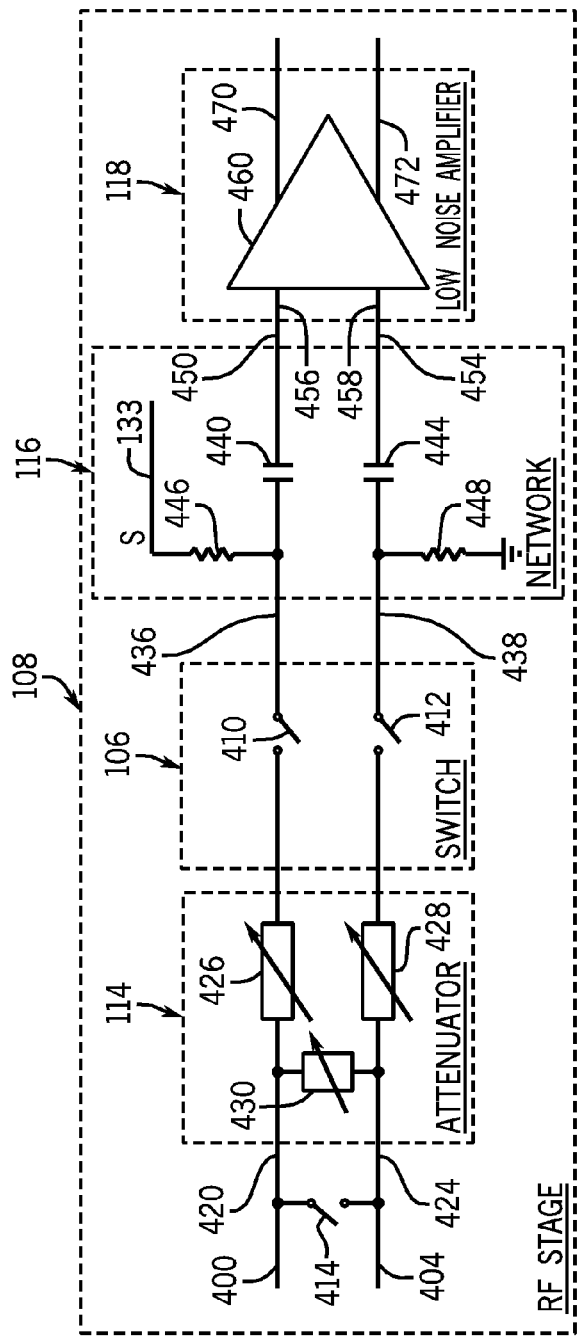
FIG. 5 is a schematic diagram of a radio frequency (RF) stage of the receiver of FIG. 2 according to an exemplary embodiment.
Figure 7:
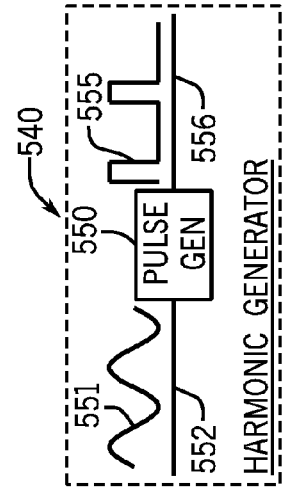
FIGS. 6 and 7 are schematic diagrams of the harmonic generator of the receiver of FIG. 2 according to exemplary embodiments.

Referring to FIG. 5, in an example embodiment of the RF stage 108, a differential RF signal is received at input terminals 400 and 404 of the stage 108. The switch 106 includes switches 410 and 412, which control communication between the terminals 400 and 404 and output terminals 436 and 438, respectively of the switch 106. Thus, during the normal mode of operation, in which calibration is not being performed, the switches 410 and 412 are closed to couple the terminals 436 and 438 to the terminals 400 and 404, respectively. As also depicted in FIG. 5, the RF stage 108 may also include a shunt switch 414 that is coupled between the terminals 400 and 404. During the calibration mode of operation, the switch 414 is closed to couple the terminals 400 and 404 together; and during the normal, non-calibration mode, the switch 414 is open.

The attenuator 114 may include, as a non-limiting example, adjustable impedance elements 426 and 428, which are placed in series with the terminals 400 and 404, respectively for purposes of selectively attenuating the received RF signal. Moreover, the attenuator 114 may also include an adjustable shunt impedance 430. In other embodiments, the switches 410 and 412 may be formed by the impedance elements 426 and 428, respectively. For example, the impedances of the elements 426 and 428 may be set to relatively large values during the calibration mode to effectively create open circuits and set to relatively small values during the receiver's normal mode of operation.

In accordance with an example embodiment, when the harmonic generator 132 is enabled to generate the S signal, the S signal is introduced into the RF stage 108 via a network 116. As a non-limiting example, the network 116 may form a voltage dividing resistor ladder with the input resistance of a differential amplifier 460. More specifically, an output terminal 133 of the harmonic generator 132 (see FIG. 2) may be coupled to one of the output terminals 436 of the attenuator 114 via a resistor 446, and a DC blocking capacitor 440 may be coupled between the output terminal 436 and an input terminal 450 of the differential amplifier 460 of the LNA 118. The other output terminal 438 of the attenuator 114 may be coupled to ground via a resistor 448, and the other output terminal 438 may be coupled to another input terminal 454 of the amplifier 460 via a DC blocking capacitor 444. In accordance with exemplary embodiments, the same resistances may be used for the resistors 446 and 448; and the same capacitances may be used for the capacitors 440 and 444. As also depicted in FIG. 5, in accordance with example embodiments, the differential amplifier 460 may include output terminals 470 and 472, which provide a differential output signal for the LNA 118.

It is noted that the network 116 may also filter the harmonic content of the S signal to selectively reduce the power of certain harmonics. For example, in some embodiments, the network 116 may filter out harmonics that are outside of the receiver's operating range.

Figure 6:
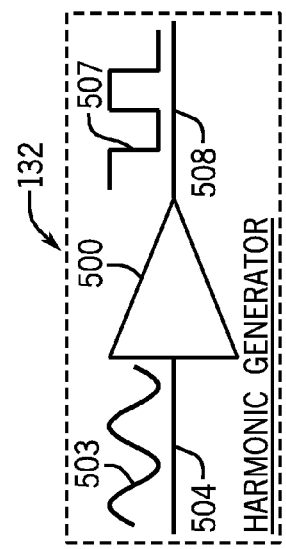

The harmonic generator 132 (see FIG. 2) may have a number of different designs, depending on the particular embodiment. In general, the harmonic generator 132 may include a nonlinear element to produce harmonics from a periodic signal that is provided by the local oscillator 128 (see FIG. 2). As an example embodiment, FIG. 6 depicts the harmonic generator 132 as being formed from a relatively strong driver 150, which receives at its input terminal 504 a sinusoidal signal 503 from the local oscillator 128. It is noted that alternatively, the local oscillator 128 may provide a square wave clock signal. In response to the sinusoidal signal 503, the driver 500 produces a square wave signal 507 at its output terminal 508. It is noted that the driver 500 may be a differential or a single-ended driver, depending on the particular embodiment. Thus, the square signal 507 contains various harmonics, such as the harmonics that are depicted in FIG. 3. As described further below in a particular example, one of the harmonics present in the square wave signal 507 is in the frequency band of the image.

As another non-limiting example, the harmonic generator 132 may be replaced by a harmonic generator 540, which includes a pulse generator 550. The pulse generator 550, in general, includes an input terminal 552 that receives a sinusoidal signal 551 from the local oscillator 128 and generates a pulse train signal 555 at its output terminal 556 in response thereto.

Figure 8:
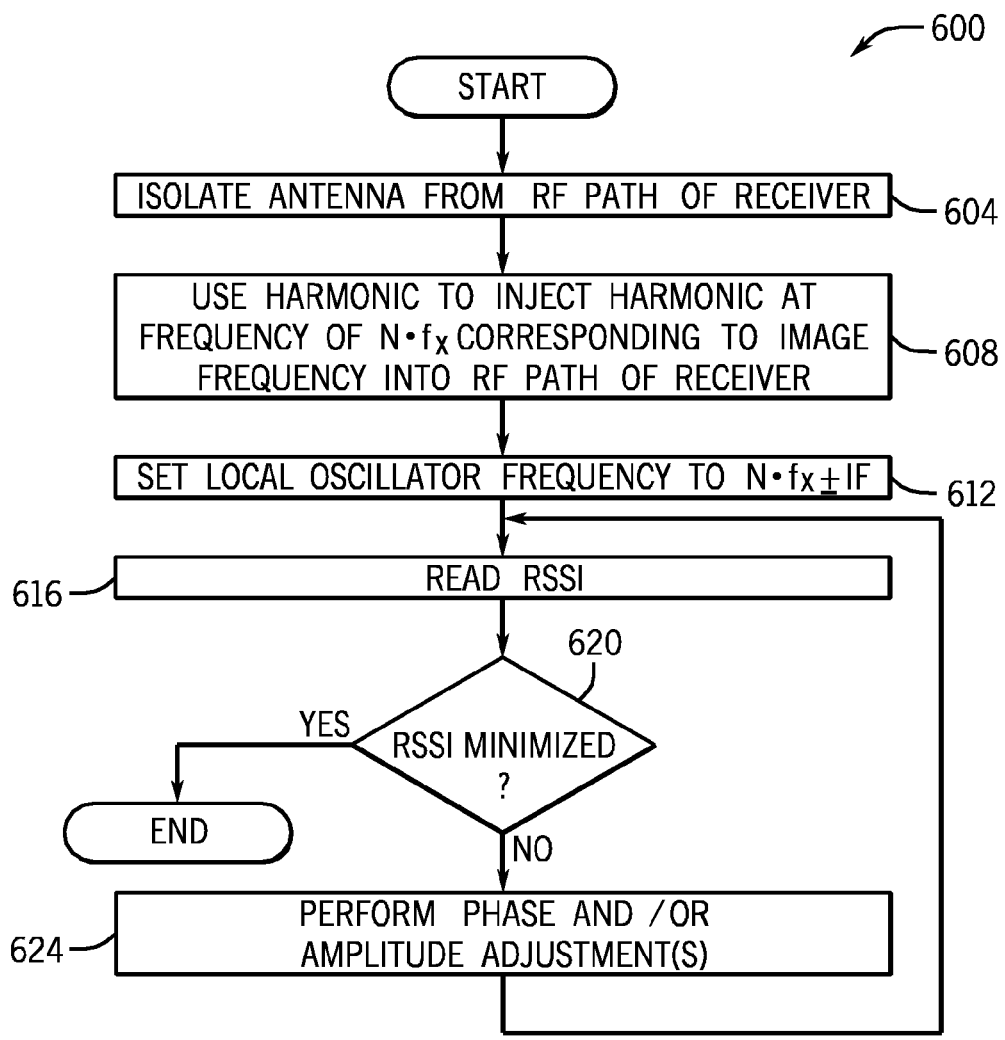

FIG. 8 generally depicts a technique 600 to calibrate the image suppression circuitry of the receiver 16 in accordance with example embodiments. Referring to FIG. 8 in conjunction with FIG. 2, pursuant to the technique 600, the antenna of the receiver 16 is isolated from the RF stage 108, pursuant to block 604. This isolation may occur by the controller 160 asserting the CAL_EN signal, for example. Next, the harmonic generator 132 is used to inject a harmonic into the RF receive path 108, pursuant to block 608. In this regard, the harmonic may be located at a frequency of "N·$f_x$," where "$f_x$" represents a fundamental frequency of the S image signal and "N" is an integer index of the harmonic.

The local oscillator frequency (i.e., the fundamental frequencies of the I and Q quadrature signals) is set (via the controller 160, for example) equal to the selected harmonic frequency plus or minus the IF center frequency. In this regard, the local oscillator frequency may be set to either a frequency of the selected harmonic frequency plus the IF center frequency or the selected harmonic frequency less the IF center frequency. This selection, in turn, causes the selected harmonic (i.e., the introduced "image") to be frequency translated by the mixer 120 to the IF band.

Next, according to the technique 600, the controller 160 reads (block 616) a received signal strength indicator (RSSI) to determine the degree of image rejection. In this manner, during the calibration mode, the image resulting from the introduced harmonic is downconverted to the IF band and processed as a received signal. The controller 160 (see FIG. 2) may monitor the signal strength of the signal downstream of the mixer 120 for purposes of determining the RSSI or alternatively, other circuitry of the receiver 16 may determine the RSSI. As an example, the controller 160 may use a peak detector (not shown) for this purpose. When the RSSI is minimized due to tuning parameters of the receiver's image suppression circuitry, then image rejection calibration is complete. Therefore, pursuant to the technique 600, the controller 160 determines (diamond 620) whether the RSSI has been minimized; and if not, the controller 160 performs corresponding phase and/or amplitude adjustments of the receiver's image suppression circuitry for purposes of minimizing the RSSI. As an example, the controller 160 may communicate signals to terminals 121 of the mixer 120 that are used to tune the frequency characteristics of the image suppression filters 122 and 123.

Other embodiments are contemplated and are within the scope of the appended claims. For example, the harmonic generator and its generated harmonic may be used for purposes other than calibrating the image suppression of the receiver. In general, the generation of the harmonic and its coupling into the RF stage 108 may be used in any of a number of configuration and/or testing applications, such as (as non-limiting examples) applications that involve a self-test of the receiver in a test mode of the receiver; a self-test of a transceiver or other circuitry that incorporates the receiver; calibration of the receiver's RSSI monitoring and generation circuitry in a corresponding calibration mode of the receiver; calibration of the receiver's AGC circuitry; and so forth.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   using a signal reception path in a radio frequency (RF) receiver to process an input signal for the receiver for a first mode of the receiver;
   using a harmonic generator of the receiver to generate a harmonic signal; and
   using the harmonic signal to replace the input signal with the harmonic signal for a second mode of the receiver, wherein the act of using the harmonic generator comprises using a square wave generator or a pulse generator.

2. The method of claim 1, wherein the using comprises using the harmonic signal during a calibration mode to calibrate an image rejection of the receiver.

3. The method of claim 1, further comprising performing at least one of the following using a response of the receiver to the harmonic signal:
   a self-test of the receiver, a received signal strength indicator (RSSI) calibration and an image calibration.

4. The method of claim 1, further comprising isolating the receive path from an antenna of the receiver for the second mode and coupling the receive path to the antenna for the first mode.

5. The method of claim 1, further comprising providing a signal from a reference oscillator of the receiver to the harmonic generator and tuning a local oscillation frequency of the receiver based on the harmonic.

6. The method of claim 5, wherein the tuning comprises tuning the local oscillation frequency to a combination of a frequency of the harmonic and an intermediate frequency.

7. The method of claim 1, further comprising coupling the harmonic generator to the receive path using a coupling network.

8. A radio frequency (RF) receiver comprising:
   an RF signal reception path to process an input signal for the receiver for a first mode of the receiver;
   an oscillator; and
   a harmonic generator to generate a harmonic signal in response to operation of the oscillator to replace the input signal with the harmonic signal for a second mode of the receiver wherein the harmonic generator comprises a square wave generator or a pulse generator.

9. The receiver of claim 8, wherein the harmonic generator is adapted to generate the harmonic signal in response to a calibration mode or a self-test mode of the receiver.

10. The receiver of claim 8, further comprising a switch to selectively isolate the antenna from the signal reception path for the second mode and couple the antenna to the signal reception path for the first mode.

11. The receiver of claim 8, further comprising a mixer and a locked loop adapted to furnish a mixing signal to the mixer in response to the operation of the oscillator.

12. The receiver of claim 11, wherein the locked loop is adapted to be tuned to a frequency based on a frequency of the harmonic and an intermediate frequency (IF).

13. The receiver of claim 8, further comprising a phase locked loop to provide at least one mixing signal for the receiver in response to a signal provided by the oscillator.

14. An apparatus comprising:
   an integrated circuit comprising a radio frequency (RF) signal reception path; an oscillator; and a harmonic generator,
   wherein the harmonic generator is adapted to generate a harmonic signal during a calibration mode of an RF receiver to calibrate an image rejection of the receiver wherein the harmonic generator comprises a square wave generator or a pulse generator.

15. The apparatus of claim 14, further comprising a switch to selectively isolate an antenna of the receiver from the signal reception path in the calibration mode.

16. The apparatus of claim 14, further comprising a mixer and a locked loop adapted to furnish a mixing signal to the mixer in response to the operation of the oscillator.

17. The apparatus of claim 14, wherein the mixer comprises an image rejection mixer.

\* \* \* \* \*